Nov. 11, 1930.  K. EDAHL  1,781,169
REFRIGERATOR CAR
Filed May 17, 1929  3 Sheets-Sheet 1

Inventor:
Knute Edahl
By Williams Bradbury
McCaleb & Hinkle
Attys.

Nov. 11, 1930.  K. EDAHL  1,781,169
REFRIGERATOR CAR
Filed May 17, 1929   3 Sheets-Sheet 2
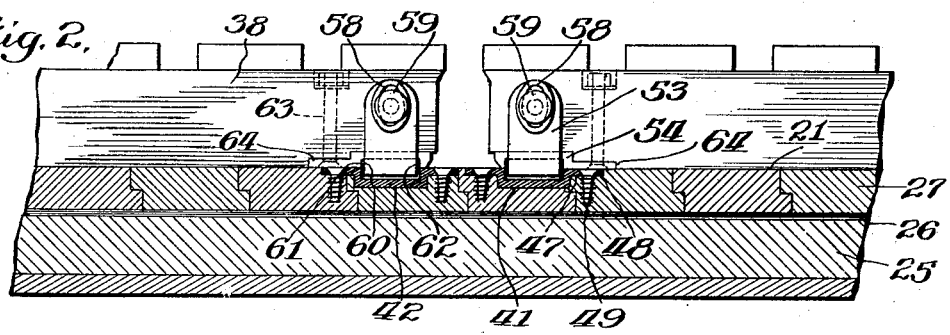
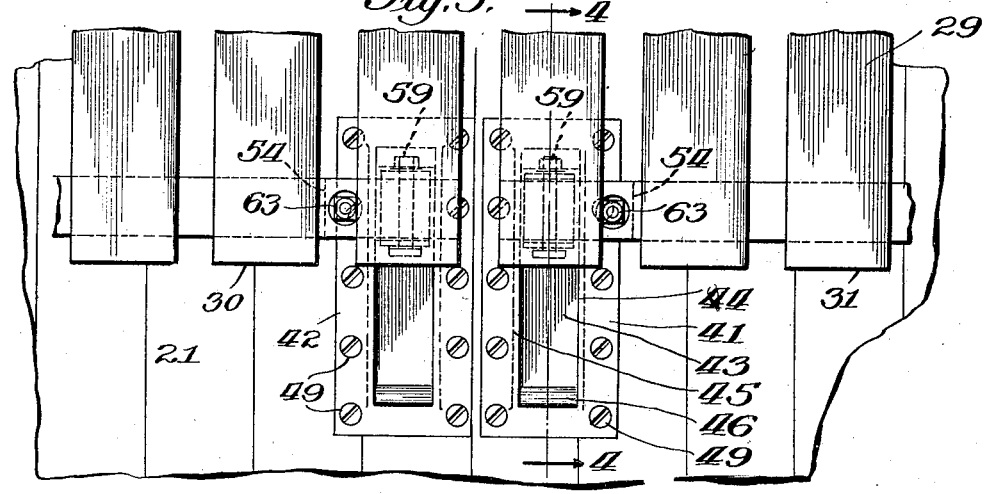
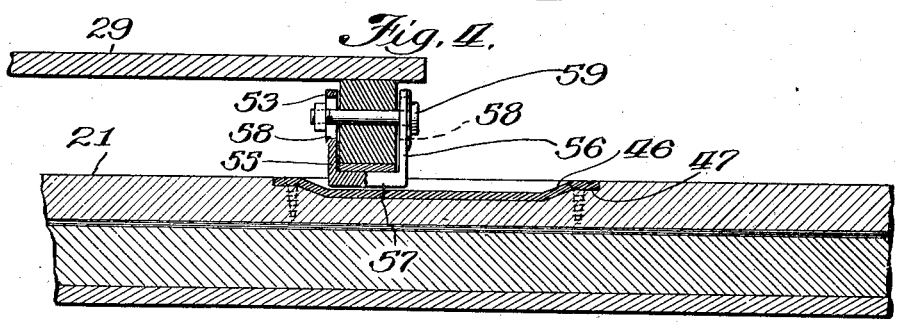
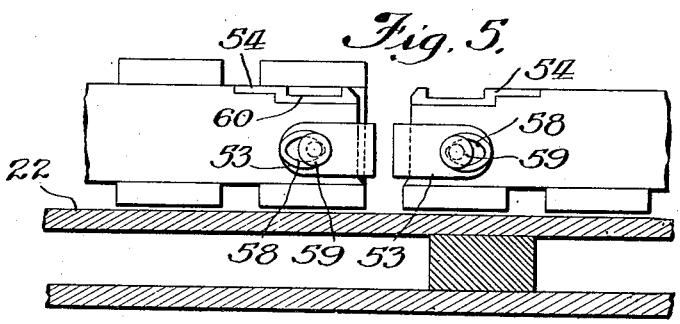
Inventor
Knute Edahl
By Williams Bradbury
McCaleb & Hinkle
Attys.

Nov. 11, 1930.  K. EDAHL  1,781,169
REFRIGERATOR CAR
Filed May 17, 1929  3 Sheets-Sheet 3
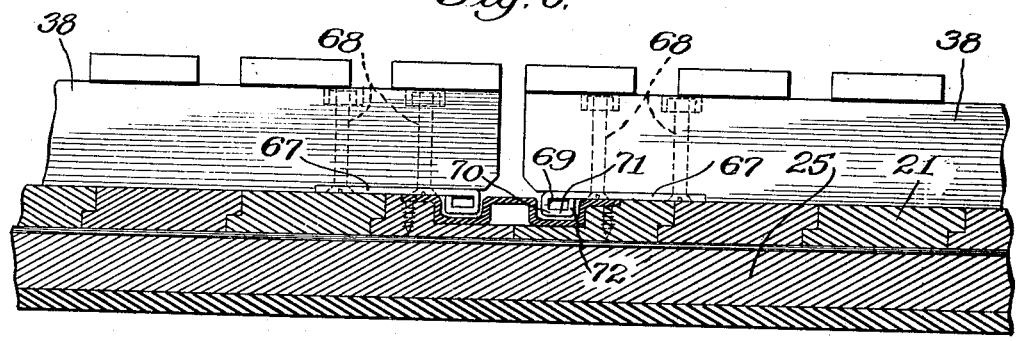
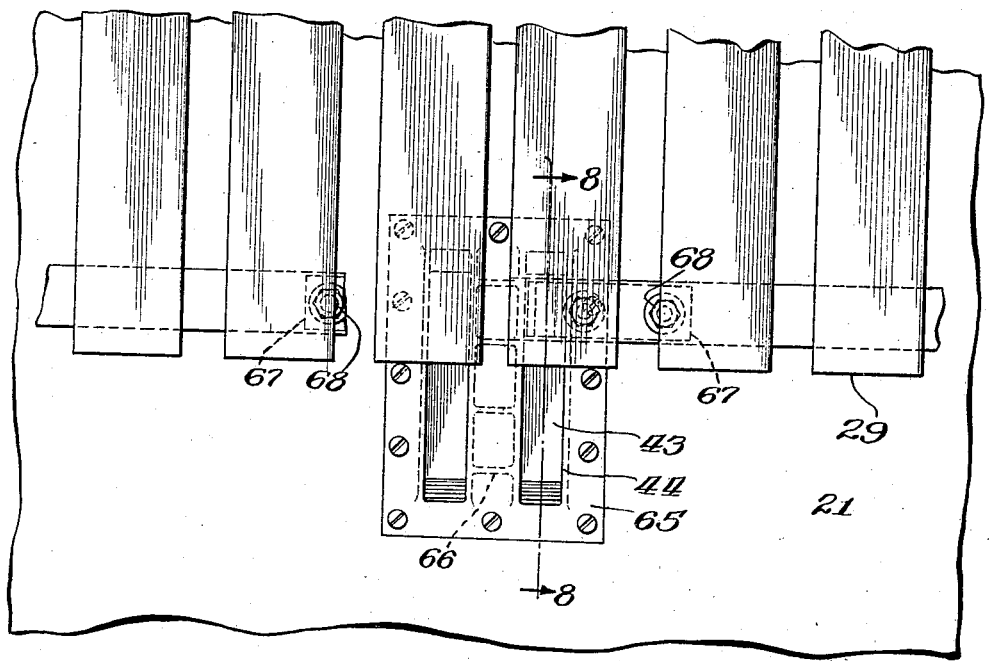
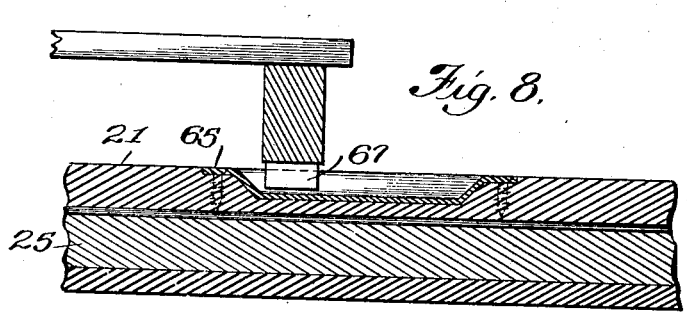
Inventor
Knute Edahl
By Williams Bradbury McCaleb & Hinkle
Attys.

Patented Nov. 11, 1930

1,781,169

UNITED STATES PATENT OFFICE

KNUTE EDAHL, OF CHICAGO, ILLINOIS

REFRIGERATOR CAR

Application filed May 17, 1929. Serial No. 363,876.

The present invention relates to refrigerator cars, and is particularly concerned with improvements relating to floor racks for refrigerator cars.

In the refrigerator cars of the prior art, the floor racks are ordinarily secured to the car adjacent the outer walls of the car, but the racks are totally lacking in securing devices adjacent the middle of the car, and the shocks to which the car may be subjected in transit cause a shifting of the cargo with the racks. This shifting of the racks with the cargo, permits one part of the cargo to crowd against other parts and against the bulkhead, often crushing parts of the cargo and the shifting of the racks often breaks the hinges or other devices which secure the racks to the car.

The constant shifting of the racks on the floor, shortens the life of the floor and whenever nails or boards are loosened, considerable damage may be caused to the floor and to the cargo by the shifting racks. The shifting of the racks also loosens their hinge fastenings, and sometimes tears off lining boards, damaging the insulation and permitting water to penetrate into the insulation.

One of the objects of the present invention is the provision of an improved refrigerator car in which the floor racks are adequately anchored in place to eliminate the foregoing difficulties and others.

Another object is positively to prevent the shifting or crawling of the floor racks under the load, to eliminate crowding or crushing of the load and to eliminate additional strains placed on a bulkhead by such shifting of the load and floor racks.

Another object is the provision of a positive anchorage for floor racks adjacent the center of the car, which will prevent loosening of the rack hinges, tearing off lining boards, wear on the floor, and other damage occasioned by shifting of the racks.

Another object is the provision of a floor rack anchorage which has no projecting parts to damage the lading when the racks are in folded position, and which is adapted to move automatically into the anchoring position when the racks are lowered to the floor.

Another object is the provision of an anchoring device which is universally applicable to old and new cars and racks, without the necessity for the removal of the racks from the car.

Another object is the provision of an anchorage for floor racks which is sturdy and simple, yet effective and economical of material and labor in its manufacture and assembly with the racks of the car.

Other objects and advantages of the invention will be apparent from the following description and from the accompanying drawings, in which similar characters of reference indicate similar parts throughout the several views.

Referring to the drawings, of which there are three sheets;

Fig. 2 is a detail sectional view of the floor rack anchorage taken on the vertical plane of the line 2—2 of Fig. 1 looking in the direction of the arrows;

Fig. 3 is a detail plan view of the anchorage shown in Figs. 1 and 2;

Fig. 4 is a sectional view taken on the vertical plane of the line 4—4 of Fig. 3, looking in the direction of the arrows;

Fig. 5 is a detail plan view of the rack anchorage with the racks in folded position, as shown at the right wall of Fig. 1;

Fig. 6 is a sectional view similar to Fig. 2, of a modified and simpler form of anchorage;

Fig. 7 is a plan view of the same anchorage;

Fig. 8 is a sectional view taken on the vertical plane of the line 8—8 of Fig. 7.

Figure 1:
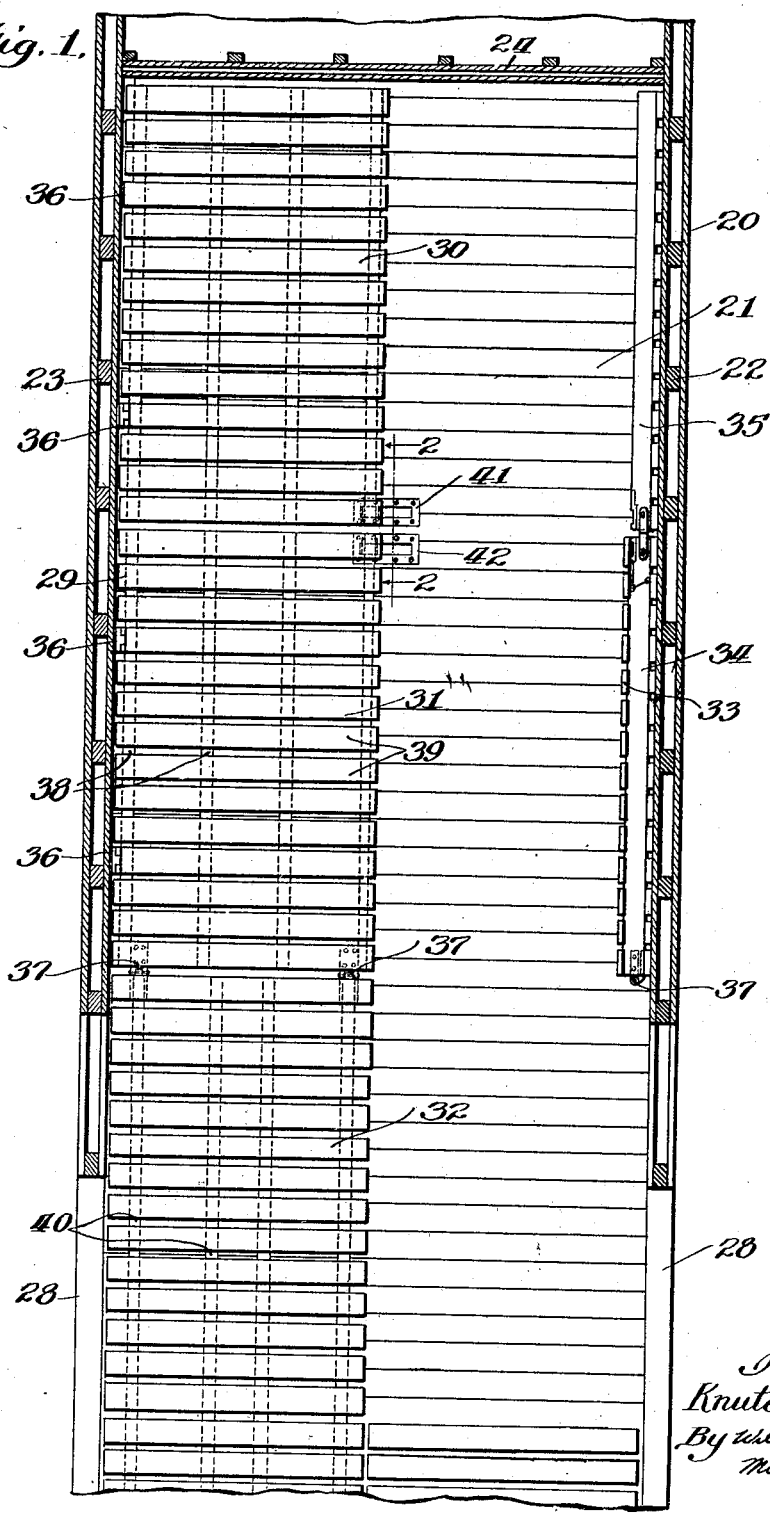
Fig. 1 is a section of a portion of a refrigerator car taken on a horizontal plane above the floor racks to show the floor racks in both positions.

Referring to Fig. 1, 20 indicates a refrigerator car or other car of the usual construction, to which the present invention is applied. Since most of the details of the refrigerator car do not affect the merits of the present invention, the car will not be described in detail, except to mention the essential elements such as the floor 21, side walls 22, and 23 and bulkhead 24, which define the cargo space in which the floor racks are generally used.

In the case of a refrigerator car, the car walls, floor and ceiling are heat insulated in the usual manner, and the heat insulation 25 of the floor is protected by a waterproof covering 26 and flooring 27 of lumber or other suitable material. Any form of bulkhead 24 may be employed to form an ice chamber at one or both ends of the car, and since both ends of the car extending each way from the central door openings 28, are usually the same, the structure for only one end of the car will be described in detail.

The floor racks 29 preferably consist of a plurality of sections 30, 31, 32, 33, 34, 35 adapted to be folded against the walls of the car whenever it is desired to use the car without floor racks. For this purpose the racks 30, 31, 34 and 35 are pivotally secured to the car walls 23 and 22, respectively, adjacent the floor 21 by a plurality of hinges 36, and the hinges 36 may be of any conventional type.

Since the rack sections 32 and 33 which cover the floor adjacent the door openings 28, would otherwise obstruct the doors, these rack sections are pivotally secured to the ends of the sections 31 and 34, respectively, by hinges 37 also carried by the ends of the sections 32 and 33.

It will thus be observed that the sections 30 and 31 may be folded up against the wall 23 in the manner shown with respect to the sections 34 and 35, after which the middle section 32 may be folded over against the section 31 as shown with respect to the section 33 in Fig. 1.

The rack sections 30—35 preferably consist of a plurality of longitudinally extending stringers 38 to which are nailed or otherwise secured a plurality of spaced transverse strips 39, and while the present embodiment is illustrated with respect to racks constructed of lumber, it will be evident that the racks may be constructed of any desirable material. Since the middle racks 32 and 33 are intended to be folded against the adjacent racks 31, 34, respectively, the middle racks 32 and 33 are preferably constructed with their stringers 40 offset slightly from the stringers 38 of the sections 31, 34 into which the middle sections are adapted to fold.

It will thus be observed that the stringers 40 of the middle sections 32, 33 may be received between the stringers 38 of the sections 31, 34 and these sections are complementary to each other for the purpose of folding into the smallest possible space. When the sections are folded as shown at the right wall of Fig. 1, they may be retained in the upper position by any convenient fastening means, such as the single hook between the middle section 33 and the wall, since the retention of this section in place will automatically retain both the sections 33 and 34 against the wall. The other sections 30, 35 and 32 may also be provided with securing devices for holding the sections in folded position.

Since the racks of the prior art were secured only adjacent the car wall, the shifting of the load placed at the center of the car upon portions of the racks having no anchorage, tended to shift the racks with the load, and the leverage provided by the substantial width of the racks was sometimes sufficient to tear the hinges and lining boards from the wall.

In any case, however, the hinges 36 permitted a considerable latitude of movement of the prior racks at the middle of the car, and the shocks caused the load upon one rack to crowd against the load on another rack so that parts of the load might be crushed, and greater strains were exerted against the bulkheads 24 at the ends of the car. Furthermore, the prior racks shifted about on the floor 21 producing wear on the floor, and if any obstructions such as loose nails were encountered, the floor was damaged, and in fact due to the absence of an effective anchorage for the racks, the prior racks did not perform effectively the function for which they were intended, that is, to protect the floor and take the wear of any shifting load.

The refrigerator cars constructed according to the present invention are provided with anchoring means for the racks, located adjacent the middle of the car and adapted positively to prevent any longitudinal shifting of any of the racks 30—35, without forming any obstructions in the floor, especially between the door openings 28 where it is frequently desirable to run trucks through the car.

The anchoring means may consist of one or more fixed anchoring members or plates 41, 42, adapted to cooperate with anchoring members 53, 54 carried by the racks. The fixed members or anchor plates 41, 42 may be constructed of sheet metal or cast metal, and in some embodiments of the invention, the pair of anchor members 41 and 42 may be constructed of a single integral piece of metal. The anchor plate 41 comprises a metal member of substantially rectangular form in the present embodiment (Fig. 3), having its longest dimension transverse to the car 20 for the purpose of providing anchoring shoulders for a pair of racks.

The anchor plate 41 is provided with a recess 43 extending longitudinally of plate 41 and transversely of car 20, the side walls 44, 45 of recess 43 forming shoulders for engagement with shoulders on the anchor members carried by the racks. For convenience in cleaning the car and sweeping out the recess 43, the ends of the recess are provided with sloping walls 46 and the plate 41 is preferably set in a complementary recess 47 in the floor ing 27. The plate 41 is provided with a plurality of counter-sunk apertures 48 for receiving wood screws 49, which secure the plate to the floor 21; and the plates 41 and 42 form recesses in the floor 21 which are reinforced by the walls of the plates to provide shoulders for engaging the anchor members carried by the racks.

Although the anchor plates 41, 42 form no obstruction in the floor 21, being mounted flush with the floor, they are preferably located adjacent the center of the car at the corners of the racks 30, 31, 34, 35, because it is desirable to maintain the floor space smooth between the door openings 28, and since the anchorage located at the point described is capable of anchoring all of the racks 30—35 by virtue of the cooperation of the hinges 37.

The movable anchor members 53 and fixed anchor members 54 carried by the racks 30—35 are adapted to be applied to any of the conventional racks in use, and consequently the movable anchor members 53 are preferably metal members of substantially U-shape (Fig. 4), having a pair of legs 55, 56 spaced sufficiently to receive one of the stringers 38, and the legs 55, 56 being joined by a yoke 57 adapted to be received in the recess 43 of anchor plate 41 carried by the floor 21.

The movable anchor members 53 are preferably movably mounted on the stringers 38 so that they may be moved to a position in which no parts project from the racks 30—35 when the racks are folded against the walls 22, 23, and consequently the legs 55, 56 are provided with apertures 58 for receiving a bolt 59 which pivotally supports the anchor members 53 on stringers 38.

Since the pivotal movement of the anchor members 53 is in a plane which extends longitudinally of the stringers 38 and substantially in the direction of the movement which is intended to be prevented, the racks 30—35 are also provided with fixed anchor members 54 comprising metal plates carried by the underside of the racks and adapted to prevent pivotal movement of the movable members 53 when the racks are in the anchored position. Thus the fixed plates 54 carried by racks 30—35 may comprise metal members secured to the lower sides of the stringers 38 adjacent the ends thereof, and immediately above the plates 41, 42. The fixed anchor plates 54 are also provided with slots or recesses 60 extending transversely to the stringers 38 and forming shoulders 61, 62 which register with the shoulders 44, 45 of the plates 41, 42 carried by the floor.

The depth of the recesses 43 in the floor plates and the recesses 60 in the rack plates are such that when both plates are placed together, as shown in Fig. 2, a recess is formed of sufficient depth to receive the yoke 57 of the movable anchor member 53. The anchor plates 54 are secured to the racks by a plurality of screw bolts 63, the plates 54 being set flush with the lower surface of the stringers 38 in recesses 64.

Since the yoke 57 is intended to be received in the slot 60 of the rack plate 54, it is necessary to provide elongated apertures 58 in the legs 55, 56 of the movable anchor member 53, and the elongated apertures 58 enable the movable anchor member or stirrup 53 to be moved downward sufficiently to clear the shoulder 62 when it is desired to move the stirrups to the position shown in Fig. 5. It should be noted, however, that the stirrups 53 are mounted quite loosely on the bolts 59 so that when the racks are moved from the position of Fig. 5 to the position of Fig. 2, the stirrups 53 naturally gravitate to the proper position below the recess 60, and the yokes 57 are forced into recess 60 when the rack engages the floor. Should the parts not register properly at the first engagement of the rack and floor, the rack will be held slightly above the surrounding racks which will bring this matter to the attention of the workmen who can readily cause the anchor to register and engage by merely shifting the racks slightly upon the floor 21.

It should be noted that when the parts are in the position shown in Fig. 2, the relatively thick yoke 57 is in direct shear between the shoulders 61, 62 on the rack plate 54 and the shoulders 44, 45 on the floor plate 41, and the racks 30, 31, 34, 35 are each positively anchored by the anchorage at the plates 41, 42.

The middle racks 32, 33 adjacent door openings 28 are provided with hinges 37 which secure them to the other racks adjacent the walls of the car and adjacent the middle of the car and the center hinges 37 are adapted to prevent any substantial movement of the middle racks 32, 33.

It is, of course, possible to provide the anchoring devices at any point in the car, but as a general rule it will be found desirable to maintain the floor space between the doors 28, smooth for the passage of trucks, without any recesses or other devices which might cause even slight bumps.

Referring to Figs. 6 to 8 inclusive, the modified form illustrated in these figures is of a more simple construction, in which the anchor members carried by the racks are not adapted to be folded into the racks. In this embodiment the plates corresponding to the floor plates 41, 42 have both been formed in a single plate 65 which is otherwise of substantially the same form as the plates 41, 42. Where the plate 65 is constructed of a casting, it may be provided with a plurality of transverse reinforcing ribs 66, but if desired, the plate 65 may be a sheet metal stamping.

Since the plate 65 is substantially identical with the parts previously described, further description is considered unnecessary.

The fixed anchor members 67 carried by the rack stringers 38 may comprise sheet metal straps, the body of which is secured longitudinally of the stringers 38 on the lower side of the stringers, by a plurality of screw bolts 68. At its outer end, the strap 67 is bent downward as at 69 to form a shoulder for engaging in the plate 65, and at 70 the strap 67 is bent backward upon itself, the parallel portion 71 being of substantially the same length as the width of the recess 43 in plate 65. The extreme end 72 of the strap 67 is bent upward into engagement with the body of the strap 67, forming a shoulder for engaging the wall 44 of plate 65, and it will thus be observed that the strap 67 is adapted to form a fixed anchor member having shoulders for engaging in the recesses of the floor plate 65. This simplified construction of the anchor member is also very effective, but the straps 67 form a slight projection upon the inner wall of the car when the racks are folded to the position shown relative to racks 33—35.

It will thus be observed that I have invented a refrigerator car in which the floor racks are positively anchored adjacent the center of the car to prevent any shifting of the floor racks, which might otherwise damage the floor, the walls or bulkhead, or which might cause damage to the load carried by the floor racks. The present anchoring device may be applied to a refrigerator car without removing the racks from the floor, and it is universally applicable to old and new cars of any type.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patents of the United States, is:

1. In a refrigerator car, the combination of a car with a plurality of floor racks, means for securing said racks to the car adjacent the car walls, and anchoring means for securing the racks at points spaced from the walls comprising female anchor members carried by the floor and male anchor members carried by said racks.

2. In a refrigerator car, the combination of a car with a plurality of floor racks, means for securing said racks to the car adjacent the car walls, and anchoring means for securing the racks at points spaced from the walls comprising female anchor members carried by the floor and male anchor members carried by said racks, said male anchor members being movably mounted to eliminate projections from the racks when the racks are folded against the car wall.

3. In a refrigerator car, the combination of a car with a plurality of floor racks, means for securing said racks to the car adjacent the car walls, and anchoring means for securing the racks at points spaced from the walls comprising female anchor members carried by the floor, male anchor members carried by said racks and female anchor members carried by said racks to receive part of said male anchor members.

4. In a refrigerator car, the combination of a floor rack with hinges for securing one edge of said rack to a car, an anchor member carried by the car floor, and having a pair of opposed shoulders, movable anchor members carried by said rack and adapted to move into or out of anchoring position, and a second anchor member carried by said rack, said movable anchor member being adapted to be received between shoulders on said other anchor members.

5. An anchorage device for floor racks, comprising a floor plate having a recess formed therein, a rack frame member, a bolt carried by said frame member, a recessed plate carried by said frame member, and a movable anchor carried by said bolt for engagement in the recesses of said plates.

6. An anchorage device for floor racks, comprising a floor plate having a recess formed therein, a rack frame member, a bolt carried by said frame member, a recessed plate carried by said frame member, and a movable anchor carried by said bolt for engagement in the recesses of said plates, said movable member comprising a metal member having a pair of legs with slots for receiving said bolt.

7. In a refrigerator car, the combination of a car with a pair of floor racks pivotally mounted adjacent the wall of said car, an anchor plate carried by the car floor at the adjacent corners of said racks opposite to said pivotal mounting, for securing both said racks; a third rack pivotally mounted to one of said pair of racks and anchor devices carried by said pair of racks for anchoring said racks against sliding movement.

8. In a refrigerator car, the combination of a car with a pair of floor racks pivotally mounted adjacent the wall of said car, an anchor plate carried by the car floor at the adjacent corners of said racks opposite to said pivotal mounting, for securing both said racks, a third rack pivotally mounted to one of said pair of racks and anchor devices carried by said pair of racks for anchoring said racks against sliding movement, said anchor devices comprising recessed plates carried by said racks and movable anchor members to engage the plates on said racks and floor.

9. In a refrigerator car, the combination of a car with a floor rack section, means for pivotally mounting said section at the outer edge of the car floor, an anchor plate carried by the floor, and an anchor member carried by the rack section adjacent the free edge of said section and adapted to engage said anchor plate to prevent sliding of said section on the floor.

10. In a refrigerator car, the combination of a car with a floor rack section, means for pivotally mounting said section at the outer edge of the car floor, an anchor plate carried by the floor, an anchor member carried by the rack section adjacent the free edge of said section and adapted to engage said anchor plate to prevent sliding of said section on the floor, and a second section having its edge pivotally mounted on said first mentioned section for movement on an axis at right angles with the pivotal movement of said first mentioned section, both of said sections being anchored against sliding movement by said plate and anchor member.

11. A rack anchor for floor racks comprising an anchor plate having a recess formed therein, said recess having tapered ends and shoulders at its sides, and an anchor member carried by the floor rack comprising a male metal member for engagement in said recess to prevent sliding of said racks.

12. A rack anchor for floor racks comprising an anchor plate having a recess formed therein, said recess having shoulders at its sides, a second anchor plate having a recess and adapted to be carried by a rack, and an anchor member adapted to be received in the recesses in said anchor plates to prevent relative sliding between the racks and a floor.

13. A rack anchor for floor racks comprising an anchor plate having a recess formed therein, said recess having shoulders at its sides, a second anchor plate having a recess and adapted to be carried by a rack, and an anchor member adapted to be received in the recesses in said anchor plates to prevent relative sliding between the racks and a floor, said anchor member being movably mounted on said rack for movement out of anchoring position.

In witness whereof, I hereunto subscribe my name this 13th day of May, 1929.

KNUTE EDAHL.